Patented May 3, 1927.

1,627,245

UNITED STATES PATENT OFFICE.

ARTHUR MARSHALL McINTOSH, OF SYDNEY, AUSTRALIA.

PROCESS FOR MAKING AND MOLDING HARD PORCELAIN.

No Drawing.     Application filed July 15, 1922. Serial No. 575,387.

The object of my invention is to provide a new and improved process for making and molding a true hard porcelain. This process involves the fusing of porcelain materials or substances and the shaping thereof under pressure. Further, by my process the use of water and bonding material may be dispensed with.

Certain results are assured which have not been attainable by methods and processes heretofore employed, or not attainable in like degree. These results may be briefly described as follows: In respect of physical properties the finished product, when my process is employed, has unusual tensile strength, greater density, and will not chip or crack off readily under ordinary conditions. Further advantages arise from the fact that the finished product, when a mold is used, is insured a more nearly exact fit.

In making hard porcelain by my process, a mold is ordinarily essential. This mold may be of metal or some suitable mineral substance. Where it is necessary to fuse the porcelain or other material in the mold as in the case of dental inlays, shell crowns and dentures, the substance used for the mold must have the same coefficient of expansion as the substance being formed. Where it is not required that the substance being formed be fused in the mold, it is not essential that the material of the mold have the same coefficient of expansion as the molded material.

In the case of electrical insulators and other such products a metallic support may be imbedded at the time the insulator is formed, when such support is desirable. This would be impracticable under methods heretofore employed.

As previously intimated, water and bonding materials may be used in my process in the discretion of the manufacturer, having in mind the particular operation to be performed and the character of the finished product desired. If used, it or they will be mixed before fusing in suitable proportions with the material for porcelain or other ceramic substance to be formed.

If the product desired is of the nature of dental inlays and shell crowns, or in any case requiring fusion in a mold, the porcelain material is then put in the mold, and both mold and porcelain material placed in a furnace.

On the other hand, the porcelain material with or without water or bonding material may be placed as a mass or sheet in the furnace and fused.

The porcelain may be molded to the desired form by the application of pressure at either of four different stages:

First,—when the ware is at fusing temperature; second,—after the original fusing and when the temperature has been permitted to fall slightly; third,—after the ware has been cooled, and again raised to a temperature slightly below fusing heat, and, fourth,—after the ware has been cooled, and again raised to fusing temperature.

Porcelain materials in the process of fusion become subject to certain chemical and physical change. Some of the ingredients become fluid, while others remain hard and constant. The hard ingredients act as a frame-work, and prevent distortion or collapse of the molded article during firing.

When glass is fused all the ingredients entering into its composition become fluid. These two conditions constitute the essential distinction between hard porcelain and glass in the process of manufacture, and the chemical and physical change which characterizes hard porcelain, and distinguishes it from glass, is one which invariably takes place in the fusion of porcelain for the purposes of my process.

In the employment of my process, the material for making porcelain may be prepared by the customary method. That is to say, pulverized silica, feldspar, clays, kaolin or other substances commonly used for making porcelain are mixed together. Water may then be added until the material is of the consistency of milk, or of cream, or of soft putty, depending upon the character of the finished product desired and the further steps to be taken in carrying out the process. Where forming of the article is to be done by the pressure method, which is the principal and essential characteristic of my process, the materials may be fused without the admixture of water or bonding material at any stage.

Whenever water is employed in my process, the porcelain may be shaped or molded before fusion. In some cases, the consistency is such that it is simply painted on the interior or exterior of a mold; in others it is poured into a mold, and in others it is mixed to the consistency of putty and pressed to the form desired. Heretofore, in making hard porcelain, the shape of the finished product has been determined prior to placing it in the furnace, whereas, with my process, the form of the finished product may be changed by the application of pressure with heat, and its physical properties altered and improved.

Heretofore it has been necessary to calculate with the utmost precision the shrinkage or contraction which the material employed will experience in the drying and fusing operations. Great particularity must be exercised in respect of the ingredients employed, both with reference to their character and proportions, and the amount of water added. In my process all shrinkage or contraction is finished before the molding takes place, so that accuracy is obtained both of form and size by the exercise of relatively less care and skill, and with the expenditure of much less time.

The porcelain material is then placed in the furnace and brought to fusing temperature. This temperature will vary according to the relative fusibility of the original ingredients employed, the rule being that the higher the grade of porcelain, the higher will be the fusing point. When the ware has reached fusing heat, pressure may be applied by means of die members of the form desired for the finished product. After being allowed to cool, an enamel or glaze may be applied in the usual way. Instead of molding when the porcelain material is at fusing heat, the temperature may be allowed to fall slightly below that point, when the substance will still remain pliable or plastic. It will then resemble a bar of steel at malleable heat. When in this condition, pressure may be applied and the substance molded to the desired shape. A third method included in my process is to allow the substance to cool gradually. It will then be in the form of what is described as "biscuit" porcelain or ware. After such cooling, the ware may be reheated until it reaches a temperature below fusing, but to such a point as will render the ware pliable or plastic. In this condition, pressure may also be applied and the shape desired obtained.

A fourth method included in my process is to allow the ware to cool, and then reheat it to fusing temperature, applying pressure to obtain the desired form.

As an illustration, but without limiting the application of my process in any manner thereto, it may be desired to produce a porcelain cup. By my process, the original procelain material may be mixed with water if it is desired, or the use of water may be entirely eliminated. The porcelain material may then be placed in or upon a vessel of fire clay or other refractory material and the whole placed in a furnace. When the mass has reached fusing heat, die members of the shape of the cup may then be applied by pressure to the fused substance, and it will be formed to the desired shape—that of a cup. Or the temperature may be allowed to fall slightly, the ware retaining plastic or pliable properties and the molding may be done in like manner. A third course that may be pursued is to take the ware out of the furnace, allow it to cool gradually and completely, when it will be what is known as "biscuit" porcelain. At any time thereafter this biscuit porcelain may be reheated, and, before reaching the fusing point will resume its plasticity or pliability, and may be molded as in the second method described. The same method may be employed as that described in the third example, except that the ware may be raised to actual fusing temperature and the pressure applied.

In addition to the methods previously described and included in my process, porcelain material previously fused or matured may be pulverized and subjected to all the operations as in the case of the original porcelain substances as hereinbefore set out, pressure being applied in the same manner and under like conditions.

The advantages of my process of making hard porcelain over processes heretofore employed may be briefly indicated as follows:

The use of water may be eliminated by my process. The admixture of water occasions the employment of expensive machinery, skilled manual labor and considerable time. Before fusing the water must be removed, an operation which also requires expensive apparatus, the application of heat, considerable time and skill and relatively large factory space. These result in delay in production and large financial expense. The ability under my process to dispense with water necessarily eliminates the resultant disadvantages enumerated.

The elimination of bonding materials, made possible by my process, enables a more rapid heating of the porcelain material, thus effecting an economy of time, and where the bonding material, as is true in some instances, causes an increased porosity of the finished product, and porosity is undesirable, this disadvantage is also removed.

The ability to use porcelain ware previously fused makes possible the utilization for the manufacture of high grade products, broken, misformed and otherwise imperfect ware. This will effect a large economy of material.

In the processes heretofore employed, contraction is experienced in the porcelain substance at two distinct stages. First: that resulting to the molded article as a whole by the drying out of the water and the consequent consolidation of the particles, and, second: that resulting during the fusion of the molded article by the contraction of the particles themselves, due to the application of intense heat. In my process, the article is molded after all contraction is completed and this not only expedites the operation, as has been previously intimated, but insures greater accuracy both as to shape, size and volume.

The application of pressure at the fusing point or at temperatures and under conditions heretofore described, and contemplated in my process, and for the purpose of molding, also produces greater density. By the employment of my process, the finished porcelain may be produced of higher grade and at less cost of both time and money.

My process may be practiced with a great variation in details of steps, and for making a great variety of articles.

For example, porcelain insulators may be made at a reasonable expense, and they have great density and high resistance to electricity.

Dentures and artificial teeth may be made with great accuracy and saving of time by being pressed to shape in proper molds.

I claim as my invention:

A process for forming porcelain ware comprising the subjection of ordinary finished porcelain to heat until plastic and then simultaneously subjecting the plastic material to pressure and molding it.

Des Moines, Iowa, June 23, 1922.

ARTHUR MARSHALL McINTOSH.